United States Patent [19]
Molock et al.

[11] Patent Number: 5,690,953
[45] Date of Patent: Nov. 25, 1997

[54] POLYMERIC OPHTHALMIC LENS WITH CROSSLINKER CONTAINING SACCHARIDE RESIDUE

[75] Inventors: Frank F. Molock, Orange Park; Ivan M. Nunez, Jacksonville; James D. Ford, Orange Park; Laura D. Elliott, Jacksonville, all of Fla.

[73] Assignee: Johnson & Johnson Vision Products, Inc., Jacksonville, Fla.

[21] Appl. No.: 712,657

[22] Filed: Sep. 13, 1996

Related U.S. Application Data

[63] Continuation of Ser. No. 409,385, Mar. 23, 1995, abandoned, which is a continuation of Ser. No. 164,504, Dec. 9, 1993, abandoned, which is a continuation of Ser. No. 17,709, Apr. 12, 1993, abandoned.

[51] Int. Cl.$^6$ ........................................... C08B 37/00
[52] U.S. Cl. ..................... 424/429; 523/108; 523/106; 526/238.23
[58] Field of Search .................... 523/106, 108; 424/429; 526/238.23

[56] References Cited

U.S. PATENT DOCUMENTS

| | | | |
|---|---|---|---|
| 5,034,461 | 7/1991 | Lai et al. | 525/100 |
| 5,039,769 | 8/1991 | Molock et al. | 526/301 |
| 5,070,166 | 12/1991 | Su et al. | 526/301 |
| 5,196,458 | 3/1993 | Nunez et al. | 523/106 |

*Primary Examiner*—Jeffrey C. Mullis

[57] ABSTRACT

An ophthalmic lens, particularly a soft hydrogel contact lens, is disclosed. The lens can be derived from a crosslinked polymer made by reacting a hydrophilic monomer with a crosslinking amount of a polyfunctional compound containing a saccharide residue. The preferred hydrophilic monomer is actually a mixture of the following individual hydrophilic monomers: a) the reaction product of a free radical reactive monoisocyanate and a monoalkoxy polyalkylether, b) N,N-dimethylacrylamide, and optionally c)hydroxyethyl methacrylate. The preferred polyfunctional compound is a prepolymer derived from an alkoxylated glucose or sucrose. This prepolymer can be made by reacting glucose or sucrose, which has been ethoxylated or propoxylated, with a free radical reactive isocyanate which has been capped. The free radical reactive isocyanate can be capped by reacting it with a polyalkylether, such as polyethylene glycol, and then reacting this intermediate with a diisocyanate.

21 Claims, No Drawings

POLYMERIC OPHTHALMIC LENS WITH CROSSLINKER CONTAINING SACCHARIDE RESIDUE

This is a continuation of application Ser. No. 08/409,385, filed Mar. 23, 1995, now abandoned which is a continuation of U.S. Ser. No. 08/164,504, now abandoned, filed Dec. 9, 1993, which was a continuation of U.S. Ser. No. 08/017,709, filed Apr. 12, 1993, abandoned.

BACKGROUND OF THE INVENTION

This invention relates to a crosslinked polymer derived from the polymerization of a hydrophilic monomer and a crosslinking agent. More specifically, it relates to such a polymer which has the properties desired for ophthalmic lenses, particularly soft hydrogel contact lenses.

Soft hydrogel contact lenses are currently the lens design of choice for extended wear applications. These lenses are derived from the polymerization of a hydrophilic monomer such as hydroxyethyl methacrylate (HEMA). Other hydrophilic monomers can be used, such as N,N-dimethylacrylamide (DMA) and N-vinyl pyrrolidone (NVP), although these alternative monomers have not yet found as wide-spread an acceptance as HEMA for the fabrication of commercially viable contact lenses for daily or extended wear applications.

A contact lens composed of the polymerization reaction product of HEMA (polyHEMA) is swollen in water to prepare a hydrogel. For higher water-containing hydrogels, the water content of the hydrogel lens is an important factor in patient comfort because the permeability of oxygen through the lens is dependent on its water content. Since the corneal tissue of the eye of a contact lens wearer needs oxygen to "breathe", the water content of the lens, and hence its oxygen permeability, are important factors in achieving an acceptable degree of wearer comfort and corneal health.

Although polyHEMA lenses can be swollen with water to prepare hydrogels with minimally acceptable water contents and oxygen permeability, such lenses composed of polyHEMA alone do not exhibit sufficient mechanical properties for routine handling and care. Accordingly, commercially available contact lenses are derived from polymerizing not only HEMA, but also a crosslinking monomer to enhance the mechanical properties of the finished lens. The crosslinking monomer conventionally used is ethylene glycol dimethacrylate (EGDMA). While the crosslinking monomer improves the mechanical properties of the finished lens, and therefore enhances the handleability of the lens, it also has adverse consequences. High levels of conventional crosslinking agents serve to reduce the water content of the finished lens and increase its brittleness. The reduced water content lowers the permeability of oxygen through the lens, which in turn decreases patient comfort and corneal health over an extended period of wear. The increase in brittleness of the lens makes the lens more fragile, and therefore more susceptible to tearing.

Since neither polyHEMA alone nor the reaction product of HEMA with a crosslinking agent has produced optimum properties for a soft contact lens, commercially available lenses typically incorporate additional monomeric components from which the lens is derived. For example, anionic monomers such as methacrylic acid (MAA) are frequently added to further increase the water content of the lens: and hydrophobic monomers, such as alkyl acrylates or methacrylates, are added to further enhance the mechanical properties of the finished lens. Unfortunately, there is still plenty of room to improve the desired properties for ophthalmic lenses, particularly soft hydrogel contact lenses, and so therefore numerous attempts have been made to develop such lenses from novel polymer systems.

Numerous examples abound in the literature of attempts to fabricate hydrogel contact lenses from unique polymer systems. What follows is a discussion of some of the more relevant teachings with respect to these alternative polymers for use in fabricating ophthalmic lenses.

U.S. Pat. No. 3,988,274 describes soft contact lenses made from a number of monomeric components designed to optimize oxygen permeability and strength. The predominant monomer is an alkylene glycol monomethacrylate such as HEMA, or a monomethacrylate of polyethylene glycol (monoester of PEG). The crosslinking monomer is a conventional polyfunctional monomer such as EGDMA, or a higher molecular weight crosslinker such as polyethylene glycol dimethacrylate. Acrylic or methacrylic acid is added to increase water content, and an alkyl ester of acrylic or methacrylic acid, such as N-hexyl methacrylate, is added to improve strength.

U.S. Pat. 5,034,461 describes contact lenses made from copolymers of conventional ethylenically reactive monomers such as HEMA, or fluorinated analogs of these monomers, and a prepolymer. The prepolymer is prepared sequentially by first reacting an isocyanate-terminated polyol with a polyalkylene glycol, and then capping this reaction product with HEMA.

U.S. Pat. No. 4,780,488 describes preparing a contact lens material from a crosslinked polymer of a polyfunctional monomer. In one embodiment, the polyfunctional monomer is made by first capping a polyalkylene glycol, e.g. polypropylene glycol (PPG), with a diisocyanate, and then functionalizing the capped polyol with ethylenic unsaturation by reacting it with HEMA. Dimensional stability may be improved by adding a conventional crosslinking agent.

European Patent Application 321,403 describes contact lenses made from crosslinked polyvinyl alcohol (PVA). In one embodiment, a PVA derivative is prepared by reacting PVA with glycidyl methacrylate (GMA). The PVA/GMA can be copolymerized with a vinylic monomer composition containing a predominant amount of a hydrophobic monomer and a minor amount of a hydrophilic monomer.

U.S. Pat. No. 4,921,956 describes preparing a reactive modifier which can be used to increase the water content of a soft contact lens made from hydrophilic polymers. The modifier, in one embodiment, contains a cyanate functionality which can be reacted with the hydrophilic monomer which is polymerized to form the lens.

More recently, an attempt has been made to develop a contact lens from a polymer containing a glucose or sucrose derivative. U.S. Pat. No. 5,196,458 discloses preparing a contact lens from a polymer containing such a glucose or sucrose derivative. A prepolymer is formed by reacting an alkoxylated glucose or sucrose with a capped, free radical reactive isocyanate, e.g. an ultraviolet light curable (UV-curable) isocyanate. The tree radical reactive isocyanate is capped by first reacting it with a polyalkyether, such as PEG or PPG, and then reacting this intermediate with a diisocyanate. In a related disclosure, European Patent Application 394,496, published Oct. 31, 1990, teaches saccharide derivatives which can be polymerized to form a polymer for biomedical applications. In one embodiment, the saccharide derivative is a glycoside derivative prepared by reacting an alkyl glycoside, such as methyl glycoside, with an ester of acrylic or methacrylic acid, such as HEMA.

Another attempt to fabricate ophthalmic lenses, especially soft hydrogel contact lenses, from alternative polymeric systems is described in European Patent Application 493, 320, published Dec. 20, 1990. This publication teaches making lenses from the following reaction product: a) a polyalkylether capped with a UV-curable isocyanate (including tri- or tetrafunctional polyalkylethers), b) a fluoromonomer with ethylenic functionality, c) a hydrophilic monomer such as HEMA or DMA, and d) a conventional crosslinker such as EGDMA.

While numerous attempts have been made to optimize the properties of ophthalmic lenses, particularly soft contact lenses, these attempts have fallen short of the ultimate goal of fabricating ophthalmic lenses with not only properties ideally suited for patient comfort and corneal health during extended wear, but also outstanding mechanical properties. What is truly needed is a polymer which has the requisite properties to achieve the highest degree of patient comfort and corneal health without appreciably sacrificing its mechanical properties when the polymer is fabricated into an ophthalmic lens, particularly a soft hydrogel contact lens.

SUMMARY OF THE INVENTION

In one aspect, the invention is a crosslinked polymer. The crosslinked polymer comprises the reaction product of a hydrophilic monomer and a crosslinking amount of a polyfunctional compound containing a saccharide residue.

In another aspect, the invention is an ophthalmic lens. The ophthalmic lens comprises the crosslinked polymer described above.

The crosslinked polymer of this invention exhibits the requisite array of properties particularly desired for ophthalmic lenses, especially soft, hydrogel contact lenses. Surprisingly, in preferred embodiments of this invention, incorporating the polyfunctional compound as a crosslinker in the polymer from which the soft hydrogel lens is derived actually enhances not only its mechanical properties, but also its properties associated with patient comfort and corneal health for extended wear applications. This is contrary to the changes in properties expected when a crosslinking monomer or prepolymer is incorporated into a polymer from which the lens is derived.

Specifically, one of the improvements observed by incorporating the polyfunctional compound into the lens is that its modulus increases, and hence its handling properties correspondingly improve. But the beneficial improvements exhibited in the properties of the lens go beyond the improved modulus. In addition, the water content of the lens unexpectedly increases with the incorporation of the polyfunctional compound, so that oxygen permeability through the lens likewise increases to enhance patient comfort and corneal health. The increased water content of the lens is achieved while maintaining its elongation, which means that the lens does not become more brittle and hence more fragile. All of these noteworthy changes in properties are contrary to those changes exhibited when conventional crosslinking monomers such as EGDMA are incorporated into the monomer system from which the polymerized lens is derived.

In a particularly preferred embodiment, the polymerization of the hydrophilic monomer and the polyfunctional compound occurs in the presence of an inert diluent in a mold for an ophthalmic lens. When preferred diluents are used in combination with a monomeric mixture incorporating a preferred polyfunctional compound as the crosslinker, the shrinkage of the polymerized lens as it forms in the mold is substantially reduced relative to that of conventional monomer-diluent systems which have been previously used in the ophthalmic art.

The crosslinked polymer of this invention can be used for any application which could benefit from the optimum balance of properties it offers. Advantageously, the polymer is used for biomedical applications, particularly for the fabrication of ophthalmic lenses, such as soft hydrogel contact lenses.

DETAILED DESCRIPTION OF THE INVENTION

The polyfunctional compound is a crosslinking agent containing at least two reactive polymerization sites. The number of reactive sites will depend on the particular saccharide chosen from which the compound is derived. The polymerization sites are preferably sites of ethylenic unsaturation, and each such site is preferably displayed at the terminus of a branch of the molecular chain of the compound.

The compound can be a polyfunctional monomer or oligomer, but preferably it is a polyfunctional prepolymer which has a relatively high molecular weight in comparison to conventional crosslinking agents used for the preparation of ophthalmic lenses, such as EGDMA. Preferably, the number average molecular weight of such a prepolymer is between about 700 to about 50,000. The most preferred number average molecular weight is between about 9,000 to about 20,000. If the molecular weight of the prepolymer were less than about 700, then the crosslink density obtained when the prepolymer is polymerized with the hydrophilic monomer to form the crosslinked polymer may be undesirably high. This increased crosslink density could adversely reduce the water content of the swollen polymer, and hence its oxygen permeability. Additionally, the polymer may exhibit a decreased elongation with an undesirable increase in its brittleness. With respect to molecular weights greater than about 50,000, although it is possible to use prepolymers with these higher molecular weights, it may be difficult to process such prepolymers for the preparation of desired ophthalmic lenses.

For the purpose of defining this invention, a "saccharide residue" is a residue of a monosaccharide, an oligosaccharide, or a polysaccharide. Preferably, the saccharide residue is a monosaccharide or oligosaccharide with 1 to 6, inclusive, more preferably 1 to 5, inclusive, more preferably 1 to 3, inclusive, sugar units. Examples of some of the preferred saccharides which can be used are set forth in European Patent Application 394,496, published Oct. 31, 1990, incorporated by reference herein. The most preferred saccharide residues are derived from monosaccharides and disaccharides. Of these, the most preferred are glucose and sucrose.

Polysaccharides can also be used for preparing the polyfunctional prepolymer. In addition, carboxyl-containing polysaccharides can be used. Examples of these include alginic acid, pectin, and certain glucosaminoglycans. Also, saccharides such as maltose, lactose, methyl-β-D-galactoside or methy-β-D-galactopyranoside and methylated deoxyribose, can be used.

In addition to the saccharide residue, the preferred polyfunctional prepolymers of this invention not only have a relatively high molecular weight in comparison to conventional crosslinking agents, but also contain a plurality of carbamate or carbamide residues. For the purpose of defining this invention, these carbamate or carbamide residues may be represented by the following formula:

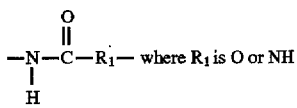

The preferred polyfunctional prepolymers are represented by the following formula:

wherein
S is the residue of a five or six membered saccharide ring;
$A=-(CH_2)_b-O-R_2-(R_3)_c-(R_4)_t-(CONH-R_5)hd\ u$
n is between 2 and 4, inclusive;
y is between 1 and 4, inclusive;
b is 0 or 1; provided that for at least one A, b is 1;
c is 0 or 1;
$R_2=(CH_2CHR_6O)_xH$;
$R_6$ is hydrogen or methyl
x is between 8 and 250, inclusive;
$R_3=-CONH-R_7-NHOC-$;
$R_7$ is a divalent radical;
$R_4=-(CH_2(CHR_6)_aX)_zCH_2(CHR_6)_aX$ when c is 1, or alternatively,
$R_4=-O-R_8$ when u is 0;
t is 0 or 1;
X=O or NH;
a is between 0 and 3, inclusive;
z is between 10 and 180, inclusive;
$R_8=C(R_9)_3[C(R_9)_2]_d(CH_2)_e(OCH_2CHR_6)_f$;
$R_9=H$ or F;
d is between 0 and 30, inclusive;
e is between 1 and 69, inclusive;
f is between 0 and 50, inclusive;
$R_5$ is a free radical reactive end group; and
u is 0 or 1, provided that u is 0 only when c and t each equal 0, and provided further that for at least one A, u is 1.

Preferably, S is the residue of a sucrose or glucose ring; n is 3 or 4, preferably 4; y is between 1 and 3, inclusive, preferably 1 or 2; c is 1; and x is between 15 and 125, inclusive, preferably between 25 and 60, inclusive. In the preferred embodiment, $R_7$ is the residue of isophorone diisocyanate (IPDI) or toluene diisocyanate (TDI); and $R_5$ is the residue of styrene isocyanate, isocyanatoethyl methacrylate, or the reaction product of HEMA with IPDI or TDI. In one preferred embodiment, when c equals 1, a is 1 or 2, preferably 1; and z is between 25 and 145, inclusive, preferably between 80 and 120, inclusive. In another preferred embodiment, when c equals 0, d is between 0 and 16, inclusive, preferably 0; e is between 15 and 50, inclusive, preferably 21 and 33, inclusive; and f is 0.

The most preferred prepolymers are those described in copending application U.S. Ser. No. 777,767, filed Oct. 15, 1991, now U.S. Pat. No. 5,196,458, issued Mar. 23, 1993 incorporated by reference herein. The preferred prepolymers are prepared by reacting an ethoxylated or propoxylated glucose or sucrose with a capped, free radical reactive isocyanate. The free radical reactive isocyanate is capped by first reacting a free radical reactive isocyanate with PEG or PPG, and then further reacting this intermediate with a diisocyanate.

For the purpose of defining this invention, a "hydrophilic monomer" refers to any monomer or mixture of monomers which, when polymerized, yields a hydrophilic polymer capable of forming a hydrogel when contacted with water. Examples of hydrophilic monomers include, but are not limited to, hydroxy esters of acrylic or methacrylic acid, DMA, NVP, styrene sulfonic and carboxylic acids, and other hydrophilic monomers known in the art.

Examples of hydroxy esters of acrylic or methacrylic acid include HEMA, hydroxyethyl acrylate, glyceryl methacrylate, hydroxypropyl methacrylate, hydroxypropyl acrylate and hydroxytrimethylene acrylate. The preferred hydroxyester is HEMA.

The most preferred hydrophilic monomers are those derived from the reaction product of a free radical reactive monoisocyanate with a monoalkoxy polyalkylether. The polyalkyl ether is desirably a polyalkylene glycol, such as PEG or PPG, or a polyalkylene glycol with amino terminals. The free radical reactive monoisocyanate can be any monoisocyanate with a polymerizable ethylenic functionality. Examples of such isocyanates include isocyanatoethyl methacrylate (IEM), styrene isocyanate, and the reaction product of HEMA with either isophorone diisocyanate (IPDI) or toluene diisocyanate (TDI). To simplify the description of this invention, these preferred hydrophilic monomers will be referred to as "monocapped PEG".

Monocapped PEG are the preferred hydrophilic monomers because such monomers provide outstanding physical properties to the crosslinked polymer in conjunction with the polyfunctional prepolymer acting as the crosslinking agent. Specifically, these hydrophilic monomers contribute significantly to increasing the modulus of the crosslinked polymer without sacrificing elongation. The use of these monomers appreciably contributes to the fabrication of ophthalmic lenses exhibiting high oxygen permeability and reduced brittleness.

The preferred monocapped PEG monomers are represented by the following formula:

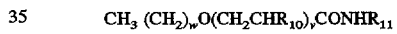

wherein
w is between 0 and 20, inclusive;
v is between 20 and 135, inclusive;
$R_{10}$ is hydrogen or methyl; and
$R_{11}$ is represented by any of the following:

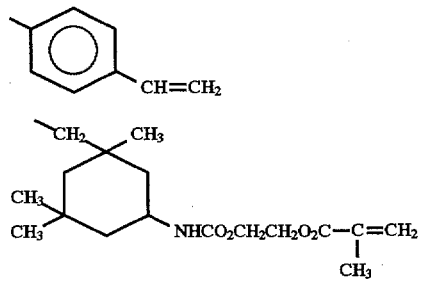

The most preferred monocapped PEGs are represented when v is between 85 and 110, inclusive; w is between 0 and 3, inclusive; $R_{10}$ is hydrogen; and $R_{11}$ is represented by the following formula:

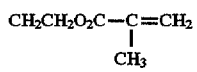

The most preferred monounsaturated polyalkylether is the reaction product of IEM with methoxyPEG because it is relatively easy to synthesize.

In the preferred embodiment of the invention, the hydrophilic monomer is a mixture of hydrophilic monomers. The preferred mixture is a mixture of monocapped PEG with DMA. The weight ratio of monocapped PEG to DMA in the hydrophilic monomer mixture is desirably between about 1.5:1 to about 4:1, preferably between about 1.5:1 to about 2.5:1. In addition, it may be desirable to add a minor amount of HEMA to the hydrophilic monomer mixture.

The hydrophilic monomers are preferably copolymerized with comonomers in a monomer reaction mixture to impart specific improvements in chemical and physical properties, depending on the particular application desired. For example, the equilibrium water content of an ophthalmic lens can be increased if MAA is used as a comonomer. Similarly, other components may be added for specific applications, for example, to impart UV absorbent or handling, enhancement or cosmetic tint properties to the finished lens.

In a particularly preferred embodiment, a fluorinated monomer is added as a coreactant in the reaction mixture. The preferred class of fluorinated monomers are those derived from the reaction product of a free radical reactive monoisocyanate with a fluorinated alcohol. The fluorinated alcohol is preferably a monohydric alcohol, preferably an aliphatic alcohol. The preferred monohydric aliphatic alcohol is a $C_{6-30}$ alcohol. The most preferred fluorinated alcohol is perfluorooctanol. With respect to the free radical reactive monoisocyanate, it can be any of the monoisocyanates described previously. However, the most preferred of these is IEM, and so therefore the most preferred fluoromonomer is the reaction product of IEM with perfluorooctanol.

Advantageously, the amount of fluorinated monomer added to the reactive monomer mixture is between about 2 to about 9 weight percent of reactive components, preferably between about 5 to about 7. The incorporation of the fluorinated monomer is particularly desired for the fabrication of ophthalmic lenses because the fluorinated monomer decreases the surface energy of the finished lens to improve its resistance to deposition of ocular tear components, such as lipids and proteins. If the amount of fluorinated monomer added to the reaction mixture were less than about 2 percent, then the decrease in surface energy of a finished ophthalmic lens may not be realized. Conversely, if the amount of fluorinated monomer were greater than about 9 percent, then the optical characteristics of a finished lens may diminish, and the water content may drop as well.

In another preferred embodiment, a second crosslinking agent is added to the reaction mixture to further increase the modulus of a finished ophthalmic lens derived from the crosslinked polymer. Although this crosslinking agent can be any polyunsaturated monomer, such as EGDMA, it preferably has a number average molecular weight between about 500 to about 2000 preferably about 750–1500. The preferred crosslinking agent is derived from the reaction product of an aromatic or cycloaliphatic polyol, e.g. bisphenol A, with a free radical reactive monoisocyanate, e.g. IEM. Its concentration in the reactive mixture is between about 5 to about 25 weight percent of the reactive compounds, preferably about 13 to about 17 percent. A concentration less than about 5 percent may fail to increase the lens modulus, and a concentration greater than about 25 percent may negatively impact water content.

In another embodiment, it may be desirable to add fluorinated analogs of the hydrophilic monomers described above, and organosilicone monomers, to the reaction mixture to further enhance properties. Examples of these monomers are given in U.S. Pat. No. 5,034,461, incorporated by reference herein.

The monomer reaction mixture also includes an initiator, usually from about 0.05 to 1 percent of a free radical initiator which is thermally activated. Typical examples of such initiators include lauroyl peroxide, benzoyl peroxide, isopropyl percarbonate, azobisisobutyronitrile, and known redox systems such as the ammonium persulfate-sodium metabisulfite combination and the like. Irradiation by ultraviolet light, electron beam or a radioactive source may also be employed to initiate the polymerization reaction, optionally with the addition of a polymerization initiator, e.g. benzoin and its ethers, as well as charge transfer initiators such as benzophenone/amine systems known in the art.

The amount of the polyfunctional compound which is copolymerized with the hydrophilic monomer and other coreactants, if any, depends on numerous factors. This amount can be readily determined empirically. The amount chosen will depend on the molecular weight of the polyfunctional compound, its degree of functionality, and the final properties of the crosslinked polymer desired. When the polyfunctional compound chosen is a prepolymer having molecular weight between 9,000 and 20,000, and contains a glucose or sucrose residue, then the concentration of prepolymer in the reaction mixture is desirably between about 0.002 to about 0.020 moles prepolymer per 100 grams of reactive monomer components, more preferably between about 0.003 to about 0.0045 moles prepolymer per 100 grams of reactive monomer components.

The polymerization of the reactive monomer mixture to form the crosslinked polymer is conveniently carried out in the presence of an inert diluent. The selection of a suitable diluent is important to solubilize the reactive components of the mixture, particularly those monomeric components which have relatively high molecular weights. Suitable diluents for the polymerization of the reactive monomers described herein are disclosed in U.S. Pat. No. 4,889,664. The preferred diluents are the boric acid esters of dihydric alcohols. The most preferred boric acid esters are those esters of polyethylene glycols, specifically, the boric acid ester of polyethylene glycol 400. The preferred amount of the boric acid ester of polyethylene glycol is between about 25 to about 65 weight percent of the reactive components, and the most preferred amount is between 35 to 50 weight percent.

For purposes of describing this invention, an "ophthalmic lens" is any lens adapted for placement on the cornea or in the eye. Examples of such lenses include scleral lenses, contact lenses, intraocular lenses, and corneal bandage lenses. The most preferred ophthalmic lens is a contact lens. The most preferred contact lens is a soft hydrogel lens. A hydrogel lens can be prepared by swelling the crosslinked polymer of this invention, which has been shaped in the form of the lens, with a significant amount of water.

The preferred methods for forming the desired lens in the presence of a suitable inert diluent include the well known methods of centrifugal casting and cast molding, for example using molds described in U.S. Pat. No. 4,568,348.

When the polymerization reaction to prepare the lens is sufficiently complete, the lens can be hydrated to its equilibrium water content. Preferably, the water content of the lens will range from about 35 to about 85 weight percent, more preferably from about 55 to about 75 weight percent. This range is considered ideal for extended wear applications where patient comfort, corneal health and handling characteristics are critical properties.

The following examples set forth the most preferred embodiments of this invention. These examples are illustrative only, and should not be interpreted to limit the scope of this invention as set forth in the appended claims. Numerous additional embodiments within the scope and spirit of the claimed invention will become readily apparent to those skilled in the art upon a detailed review of this specification.

Test Method 1

Oxygen Permeability (Dk)

The oxygen permeability through the lens is expressed as the Dk value multiplied by $10^{-11}$, in units of $cm^2$ ml $O_2$/s ml mm Hg. It is measured using a polagraphic oxygen sensor consisting of a 4 mm diameter gold cathode and silver-silver chloride ring anode.

Test Method 2

Tensile Properties (Modulus, Elongation and Strength)

The lens to be tested is cut to the desired specimen size and shape and the cross-sectional area measured. The specimen is then attached into the upper grip of a constant rate-of-crosshead-movement type of testing machine equipped with a load cell. The crosshead is lowered to the initial gauge length and the specimen attached to the fixed grip. The specimen is then elongated at a constant rate of strain and the resulting stress-strain curve is recorded. The elongation is expressed in percent and the tensile modulus and strength is expressed in psi (pounds per square inch).

Test Method 3

Gravimetric Water Content (Equilibrium Water Content-EWC)

Flat discs are made which weigh approximately 5–8 grams. These discs are equilibrated in physiological saline, weighed and then dehydrated and weighed. gravimetric water content is expressed as a percent difference after a constant weight is recorded.

EXAMPLE 1

Synthesis of Glucam E-20-polyethylene glycol (PEG) 1000

A total of 100 g (0.100 mol) of dry PEG 1000 is placed into a 1L three neck flask equipped with mechanical agitation, and gas-inlet tube. The system is flushed with dry nitrogen and then dry oxygen. To the PEG 1000 are added 375 g of dry acetonitrile and allowed to mix until the PEG 1000 has completely dissolved. Subsequently, 2 drops of Stannous Octoate and 500 ppm MEHQ are added. Via a dropping funnel are added 15.20 g (0.098 mol) of isocyanatoethyl methacrylate. The reaction is allowed to proceed at room temperature for 24–28 hours. The progress of the reaction is followed by the disappearance of the NCO absorption at 2270 $cm^{-1}$ in the infrared spectra. When the peak at 2270 $cm^{-1}$ has completely gone the above reaction mixture is transferred to a dropping funnel. The contents of the dropping funnel are slowly added to a solution containing 200 g of dry acetonitrile and 17.42 g (0.100 mol) of 2,4-toluene diisocyanate. The reaction is again followed by infrared noting the reduction followed by the disappearance of the hydroxyl peak at around 3400 $cm^{-1}$. To the above mixture are added 27.5 g (0.025 mol) of Glucam E-20. After the adsorption at 2270 $cm^{-1}$ has gone the acetonitrile is removed under reduced pressure and the resultant white waxy solid Glucam E-20 PEG 1000 is used as is.

EXAMPLE 2

A blend is prepared using 94.60% hydroxyethyl methacrylate (HEMA), 5.0% of the Glucam E-20 PEG 1000 prepared in Example 1, and 0.40% Darocur 1173 The above blend is mixed at 40° C. for thirty minutes under reduced pressure (<10 mm Hg) then transferred to a contact lens mold. The filled mold is exposed to UV light (wavelength 300–380nm, Dose=1.2–1.6 Joules/$cm^2$) for twenty minutes at approximately 60° C. The lens molds are then separated and placed into distilled water at 50° C. for three to four hours. After the initial hydration period the lenses are allowed to equilibrate in physiological saline. The lenses are now tested according to test methods 1,2, and 3, respectively.

EXAMPLE 3

Contact lenses arm made from a blend composed of 84.60% HEMA, 15.00% of the Glucam E-20 PEG 1000, and 0.40% Darocur 1173. This blend is treated analogously to that of Example 2 and tested according to test methods 1,2, and 3, respectively.

EXAMPLE 4

Contact lenses are made from a blend composed of 74.60% HEMA, 25.00% of the Glucam E-20 PEG 1000, and 0.40% Darocur 1173. This blend is treated analogously to that of Example 2 and tested according to test methods 1,2, and 3, respectively.

EXAMPLE 5

Contact lenses are made from a blend composed of 4.60% HEMA, 35.00% of the Glucam E-20 PEG 1000, and 0.40% Darocur 1173. This blend is treated analogously to that of Example 2 and tested according to test methods 1,2, and 3, respectively.

TABLE 1

Properties of Soft Hydrogel Contact Lenses

| Example # | % GluPEG1000 | % EWC | Modulus | Elongation | Tensile | Dk |
|---|---|---|---|---|---|---|
| Example 2 | 5 | 46 | 90 | 190 | 101 | 25 |
| Example 3 | 15 | 51 | 92 | 160 | 103 | 27 |
| Example 4 | 25 | 54 | 98 | 170 | 104 | 31 |
| Example 5 | 35 | 56 | 104 | 160 | 107 | 32 |

As can be seen from Table 1, as the Glucam E-20 PEG 1000 derivative is increased, the water content, modulus, and oxygen permeability of the lens increase.

EXAMPLE 6

(Synthesis of Glucam P-20 derivative)

A total of 200 g (0.1515 mol) of dry Glucam P-20 is placed into a 1L three neck flask equipped with mechanical agitation, and gas-inlet tube. The system is flushed with dry nitrogen and then dry oxygen. To the Glucam E-20 are added 600 g of dry acetonitrile and allowed to mix until the Glucam P-20 has completely dissolved. Subsequently, 2 drops of stannus octoate and 500 ppm MEHQ are added. Via a dropping funnel are added 42.91 g (0.277 mol) of isocyanatoethyl methacrylate. The reaction is allowed to proceed at room temperature for 24–28 hours. The progress of the reaction is followed by the disappearance of the NCO absorption at 2270 $cm^{-1}$ in the infrared spectra. The acetonitrile is removed under reduced pressure and the viscous Glucam P-20 derivative is used as is.

EXAMPLE 7

A blend is prepared using 94.60% hydroxyethyl methacrylate (HEMA), 5.0% of the Glucam P-20 derivative prepared in Example 6, and 0.40% Darocur 1173 The above blend is mixed at 40° C. for thirty minutes under reduced pressure (<10 mm Hg) then transferred to a contact lens mold. The filled mold is exposed to UV light (wavelength 300–380nm, Dose =1.2–1.6 Joules/cm$^2$) for twenty minutes at approximately 60° C. The lens molds are then separated and placed into distilled water at 50° C. for three to four hours. After the initial hydration period the lenses are allowed to equilibrate in physiological saline. The lenses are now tested according to test methods 1,2, and 3, respectively.

EXAMPLE 8

Contact lenses are made from a blend composed of 84.60% HEMA, 15.00% of the Glucam P-20 derivative. This blend is treated analogously to that of Example 7 and tested according to test methods 1,2, and 3, respectively.

EXAMPLE 9

Contact lenses are made from a blend composed of 74.60% HEMA, 2D.00% of the Glucam P-20 derivative. This blend is treated analogously to that of Example 7 and tested according to test methods 1,2, and 3, respectively.

EXAMPLE 10

Contact lenses are made from a blend composed of 59.60% HEMA, 40.00% of the Glucam P-20 derivative. This blend is treated analogously to that of Example 7 and tested according to test methods 1,2, and 3, respectively.

TABLE 2

Properties of Soft Hydrogel Contact Lenses

| Example # | % GLU P-20 Der | % EWC | Modulus | Elongation | Tensile | Dk |
|---|---|---|---|---|---|---|
| Example 7 | 5 | 42 | 71 | 150 | 98 | 11 |
| Example 8 | 15 | 41 | 79 | 170 | 100 | 12 |
| Example 9 | 25 | 40 | 85 | 160 | 91 | 9 |
| Example 10 | 40 | 38 | 98 | 155 | 110 | 8 |

As can be seen from Table 2, as the Glucam P-20 derivative is increased, the water content and Dk decrease and the modulus increases.

EXAMPLE 11

(Synthesis of Glucam E-20-polyethylene glycol (PEG) 4500)

A total of 100 g (0.0220 mol) of dry PEG 4500 is placed into a 1L three neck flask equipped with mechanical agitation, and gas-inlet tube. The system is flushed with dry nitrogen and then dry oxygen. To the PEG 4500 are added 375 g of dry acetonitrile and allowed to mix until the PEG 4500 has completely dissolved. Subsequently, 2 drops of Stannous Octoate and 500 ppm MEHQ are added. Via a dropping funnel are added 3.41 g (0.022 mol) of isocyanatoethyl methacrylate. The reaction is allowed to proceed at room temperature for 24–28 hours. The progress of the reaction is followed by the disappearance of the NCO absorption at 2270 cm$^{-1}$ in the infrared spectra. When the peak at 2270 cm$^{-1}$ has completely disappeared the above reaction mixture is transferred to a dropping funnel. The contents of the dropping funnel are slowly added to a solution containing 200 g of dry acetonitrile and 3.83 g (0.0220 mol) of 2,4-toluene diisocyanate. The reaction is again followed by infrared noting the reduction followed by the disappearance of the hydroxyl peak at around 3400 cm$_{-1}$. To the above mixture are added 6.0 g (0.006 mol) of Glucam E-20. After .the adsorption at 2270 cm$^{-1}$ has disappeared the acetonitrile is removed under reduced pressure and the resultant white waxy Glucam E-20 PEG 4500 solid is used as is.

EXAMPLE 12

(Synthesis of Inert Diluent PEG 400 BAE (boric acid ester))

A total of 400 g (1 mol) of polyethylene glycol 400 (PEG 400) is placed into a 2L rotary evaporator flask. To the above flask are added 108.2 g (1.75 mol) of boric acid. The flask is placed on a rotary evaporator and the pressure is slowly reduced (<0.05–1 mm Hg). After full vacuum is established the temperature of the bath is slowly raised to 92° C. Water is recovered from the reaction as the boric acid ester is formed. The clear viscous liquid PEG 400 BAE is used as is.

EXAMPLE 13

A blend is prepared using 58.56% hydroxyethyl methacrylate (HEMA), 1.20% of the Glucam E-20 PEG 4500 prepared in Example 11, 0.24% Darocur 1173, and 40% of the inert diluent PEG 400 BAE prepared in Example 12. The above blend is mixed at 40° C. for thirty minutes udder reduced pressure (<10 mm Hg) then transferred to a contact lens mold. The filled mold is exposed to UV light (wavelength=300–380nm, Dose=1.2–1.6 Joules/cm$^2$) for twenty minutes at approximately 60° C. The lens molds are then separated and placed into distilled water at 50° C. for three to four hours. After the initial hydration period the lenses are allowed to equilibrate in physiological saline. The lenses are now tested according to test methods 1,2, and 3, respectively.

EXAMPLE 14

Contact lenses are made from a blend composed of 55.56% HEMA, 4.20% of the Glucam E-20 PEG 4500 prepared in Example 11, 0.24% Darocur 1173, and 40% of the inert diluent prepared in Example 12. This blend is treated analogously to that of Example 13 and tested according to test methods 1,2, and 3, respectively.

EXAMPLE 15

Contact lenses are made from a blend composed of 55.56% HEMA, 6.60% of the Glucam E-20 PEG 4500 prepared in Example 11, 0.24% Darocur 1173, and 40% of the inert diluent prepared in Example 12. This blend is treated analogously to that of Example 13 and tested according to test methods 1,2, and 3, respectively.

EXAMPLE 16

Contact lenses are made from a blend composed of 45.36% HEMA, 14.40% of the Glucam E-20 PEG 4500 prepared in Example 11, 0.24% Darocur 1173, and 40% of the inert diluent prepared in Example 12. This blend is treated analogously to that of Example 13 and tested according to test methods 1,2, and 3, respectively.

EXAMPLE 17

Contact lenses are made from a blend composed of 36.36% HEMA, 23.40% of the Glucam E-20 PEG 4500 prepared in Example 11, 0.24% Darocur 1173, and 40% of the inert diluent prepared in Example 12. This blend is treated analogously to that of Example 13 and tested according to test methods 1,2, and 3, respectively.

EXAMPLE 18

Contact lenses are made from a blend composed of 29.76% HEMA, 23.40% of the Glucam E-20 PEG 4500 prepared in Example 11, 0.24% Darocur 1173, and 40% of the inert diluent prepared in Example 12. This blend is treated analogously to that of Example 13 and tested according to test methods 1,2, and 3, respectively.

TABLE 3

Properties of Soft Hydrogel Contact Lenses

| Example # | % GLUPEG 4500 | % EWC | Modulus | Elongation | Tensile | Dk |
|---|---|---|---|---|---|---|
| Example 13 | 2 | 40 | 48 | 189 | 79 | 12 |
| Example 14 | 7 | 49 | 52 | 145 | 77 | 14 |
| Example 15 | 11 | 54 | 58 | 171 | 82 | 19 |
| Example 16 | 24 | 65 | 59 | 130 | 77 | 27 |
| Example 17 | 39 | 72 | 74 | 131 | 86 | 34 |
| Example 18 | 50 | 76 | 89 | 105 | 81 | 39 |

As can be Seen in Table 3, as the Glucam E-20 PEG 4500 derivative increases the EWC, modulus, and Dk increase.

EXAMPLE 19

(Synthesis of dicapped Bis Phenol A (BPA) 890).

A total of 200 g (0.345 mol) of dry Photonol 7025 is placed into a 1L three neck flask equipped with mechanical agitation, and gas-inlet tube. The system is flushed with dry nitrogen and then dry oxygen. To the BPA are added 375 g of dry acetonitrile and allowed to mix until the BPA has completely dissolved. Subsequently 2 drops of stannous octoate and 500 ppm MEHQ are, added. Via a dropping funnel are added 107.1 g (0.690 mol) of isocyanatoethyl methacrylate. The reaction is allowed to proceed at room temperature for 24–28 hours. The progress of the reaction is followed by the disappearance of the NCO absorption at 2270 cm$^{-1}$ in the infrared spectra. The acetonitrile is removed under reduced pressure, and the resultant viscous liquid dicapped SPA 890 is used as is.

EXAMPLE 20

(Synthesis of Fluoro Monomer (FM))

A total of 200 g (0.050 mol) of dry 2,2,3,3,4,4,5,5,6,6,7,7,8,8,8-Pentadecafluoro-1-octanol is placed into a 1L three neck flask equipped with mechanical agitation, and gas-inlet tube. The system is flushed with dry nitrogen and then dry oxygen. To this fluoro alcohol are added 375 g of dry acetonitrile and allowed to mix for fifteen minutes. Subsequently, 2 drops of stannous octoate are added to the acetonitrile/2,2,3,3,4,4,5,5,6,6,7,7,8,8,8-Pentadecafluoro-1-octanol mixture. Via a dropping funnel are added 15.52 g (0.100 mol) of isocyanatoethyl methacrylate. The reaction is allowed to proceed at room temperature for 24–28 hours. The progress of the reaction is followed by the disappearance of the NCO absorption at 2270 cm$^{-1}$ in the infrared spectra. The acetonitrile is removed under reduced pressure and the resultant white waxy fluoromonomer is used as is.

EXAMPLE 21

(Synthesis of monocapped monomethoxy polyethylene glycol (mPEG) 2000)

A total of 200 g (0.10 mol) of dry mPEG 2000 is placed into a 1L three neck flask equipped with mechanical agitation, and gas-inlet tube. The system is flushed with dry nitrogen and then dry oxygen. To this mPEG 2000 are added 600 g of dry acetonitrile and allowed to mix until the mPEG 2000 has completely dissolved. Subsequently, 2 drops of stannous octoate and 500 ppm MEHQ awe added. Via a dropping funnel are added 15.51 g (0.10 mol) of isocyanatoethyl methacrylate. The reaction is allowed to proceed at room temperature for 24–28 hours. The progress of the reaction is followed by the disappearance of the NCO absorption at 2270 cm$^{-1}$ in the infrared spectra. The acetonitrile is removed under reduced pressure and the white waxy monocapped mPEG 2000 is used as is.

EXAMPLE 22

A blend is prepared using 9.36% hydroxyethyl methacrylate (HEMA), 21.0% of the Glucam E 20 PEG 4500 prepared in Example 11, 15% of the mPEG 2000 prepared in Example 21, 10.2% of the BPA 890 prepared in Example 19, and 4.20% of the fluoromonomer prepared in example 20, 0.24% Darocur 1173, and 40% of the inert diluent prepared in Example 12. The above blend is maintained at 40° C. for thirty minutes under reduced pressure (<10 mm Hg) then transferred to a contact lens mold. The filled mold is exposed to UV light (wavelength=300–380nm, Dose=1.2–1.6 Joules/cm$^2$) for twenty minutes at approximately 60° C. The lens molds are then separated and placed into distilled water at 50° C. for three to four hours. After the initial hydration period the lenses are allowed to equilibrate in physiological saline. The lenses are now tested according to test methods 1,2, and 3, respectively.

EXAMPLE 23

A blend is prepared using 3.36% hydroxyethyl methacrylate (HEMA), 21.0% of the Glucam E-20 PEG 4500 prepared in Example 11, 21.0% of the mPEG 2000 prepared in Example 21, 10.2% of the BPA 890 prepared in Example 19, and 4.20% of the fluoromonomer prepared in Example 20, 0.24% Darocur 1173, and 40% of the inert diluent prepared in Example 12. The above blend is maintained at 40° C. for thirty minutes under reduced pressure (<10 mm Hg) then transferred to a contact lens mold. The filled mold is exposed to UV light (wavelength=300–380nm, Dose=1.2–1.6 Joules/cm$^2$) for twenty minutes at approximately 60° C. The lens molds are then separated and placed into distilled water at 50° C. for three to four hours. After the initial hydration period the lenses are allowed to equilibrate in physiological saline. The lenses are now tested according to test methods 1,2, and 3, respectively.

TABLE 4

Properties of Soft Hydrogel Contact Lenses

| Example # | % EWC | Modulus | Elongation | Tensile | Dk |
|---|---|---|---|---|---|
| Example 22 | 73 | 91 | 118 | 125 | 49 |
| Example 23 | 77 | 101 | 125 | 122 | 55 |

As can be seen from Table 4, various combinations of the monomers and crosslinkers disclosed within will give contact lens materials with superior oxygen permeability and mechanical properties.

We claim:

1. A crosslinked polymer comprising the reaction product of a hydrophilic monomer and a crosslinking amount of a polyfunctional compound having the following formula:

wherein

S is the residue of a five or six membered saccharide ring;

$A = —(CH_2)_b—O—R_2—(R_3)_c—(R_4)_t—(CONH—R_5)_u$ n is between 2 and 4, inclusive;

y is between 1 and 4, inclusive;

b is 0 or 1; provided that for at least one A, b is 1;

c is 0 or 1;

$R_2 = —(CH_2CHR_6O)_x—$;

$R_6$ is hydrogen or methyl;

x is between 8 and 250, inclusive;

$R_3 = —CONH—R_7—NHOC—$ $R_7$ is a divalent radical which is a residue of either isophorone diisocyanate or toluene diisocyanate;

$R_4 = X_1—(CH_2(CHR_6)_a X)_z CH_2(CHR_6)_a X$ when c is 1 and u is 1, or alternatively, $R_4 = O—R_8$ when u=0;

t=0 or 1;

$x_1$=O or NH;

X=O or NH;

a is between 0 and 3, inclusive;

z is between 10 and 180, inclusive;

$R_8 = —(CHR_6CH_2O)_f(CH_2)_e(C(R_9)_2)_d C(R_9)_3$;

$R_9$=H or F;

d is between 0 and 30, inclusive;

e is between 1 and 69, inclusive;

f is between 0 and 50, inclusive;

u is 0 or 1, provided that u is 1 for at least one A per y;

$R_5$ is a free radical reactive end group.

2. The polymer of claim 1 wherein s is the residue of a saccharide or glucose ring; n is 3 or 4; y is between 1 and 3, inclusive; c is 1; and x is between 15 and 125, inclusive.

3. The polymer of claim 2 wherein n is 4; y is 1 or 2; and x is between 25 and 60, inclusive.

4. The polymer of claim 3 comprising one or more hydrophilic monomer selected from the group consisting of monocapped PEG, an hydroxy ester of acrylic or methacrylic acid, N,N-dimethylacrylamide, N-vinyl Pyrrolidone, styrene sulfonic and carboxylic acid.

5. The polymer of claim 4 wherein the hydroxy ester is hydroxyethyl methacrylate, hydroxyethyl acrylate, glyceryol methacrylate, hydroxypropyl methacrylate hydroxypropyl acrylate or hydroxytrimethylene acrylate.

6. The polymer of claim 1 wherein the hydrophilic monomer is a fluorinated monomer.

7. The polymer of claim 6 wherein the fluorinated monomer is derived from the reaction product of a free radical reactive monoisocyanate and a fluorinated alcohol.

8. The polymer of claim 7 wherein the amount of the fluorinated monomer in the reactive monomer mixture from which the polymer is derived is between about 2 to about 9 percent of the weight of the reactive components which polymerize to form the polymer.

9. The polymer of claim 7 further comprising second crosslinking agent.

10. The polymer of claim 9 wherein the second crosslinking agent is derived from the reaction product of an aromatic or cycloaliphatic polyol with a free radical reactive monoisocyanate.

11. The polymer of claim 10 wherein the amount of the second crosslinking agent in the reactive monomer mixture from which the polymer is derived is between about 5 to about 25 percent of the weight of the reactive components which polymerize to form the polymer.

12. The polymer of claim 11 wherein the crosslinking amount of the polyfunctional compound in the reactive monomer mixture from which the polymer is derived is between about 0.002 to about 0.045 moles compound per 100 grams of reactive monomer components which polymerize to form the polymer.

13. The polymer of claim 12 wherein the crosslinking amount of the polyfunctional compound in the reactive monomer mixture from which the polymer is derived is between about 0.003 to about 0.020 moles prepolymer per 100 grams of reactive monomer components which polymerize to form the polymer.

14. The polymer of claim 13 wherein the polymer is prepared in the presence in an inert diluent.

15. The polymer of claim 14 wherein the inert diluent is a boric acid ester of a dihydric alcohol.

16. An ophthalmic lens comprising the crosslinked polymer of claim 15.

17. The lens of claim 16 wherein the lens is a contact lens, intraocular lens, or corneal bandage lens.

18. The lens of claim 17 wherein the lens is a contact lens.

19. The lens of claim 18 wherein the lens is hydrated to form a soft hydrogel contact lens.

20. The lens of claim 19 wherein the water content of the lens is between about 35 to about 85 weight percent.

21. The lens of claim 20 wherein the water content of the lens is between about 55 to about 75 weight percent.

* * * * *

UNITED STATES PATENT AND TRADEMARK OFFICE
CERTIFICATE OF CORRECTION

PATENT NO. : 5,690,953
DATED : Nov. 25, 1997
INVENTOR(S) : Frank F. Molock et al.

It is certified that error appears in the above-indentified patent and that said Letters Patent is hereby corrected as shown below:

Column 14, line 64, after "monomer" insert --in an amount of at least 50% by weight of the crosslinked polymer--.

Signed and Sealed this

Ninth Day of June, 1998

Attest:

BRUCE LEHMAN

*Attesting Officer*  *Commissioner of Patents and Trademarks*